(12) United States Patent
Cox

(10) Patent No.: US 9,930,868 B2
(45) Date of Patent: Apr. 3, 2018

(54) WASTE DISPOSAL AND STORAGE DEVICE

(71) Applicant: David Scott Cox, Santa Ana, CA (US)

(72) Inventor: David Scott Cox, Santa Ana, CA (US)

(*) Notice: Subject to any disclaimer, the term of this patent is extended or adjusted under 35 U.S.C. 154(b) by 60 days.

(21) Appl. No.: 14/945,304

(22) Filed: Nov. 18, 2015

(65) Prior Publication Data

US 2016/0135432 A1    May 19, 2016

Related U.S. Application Data

(60) Provisional application No. 62/082,082, filed on Nov. 19, 2014.

(51) Int. Cl.
  A01K 27/00        (2006.01)

(52) U.S. Cl.
  CPC .......... A01K 27/008 (2013.01); A01K 27/003 (2013.01)

(58) Field of Classification Search
  USPC ....... 119/795, 858, 769, 792, 712, 770, 791, 119/793, 798, 867, 868, 869; D30/161; 150/107–109; 190/115; 224/578, 579, 224/580; 383/6, 7, 8, 16, 22
  See application file for complete search history.

(56) References Cited

U.S. PATENT DOCUMENTS

| | | | |
|---|---|---|---|
| 4,966,259 A * | 10/1990 | Bergman | A45C 13/262 16/113.1 |
| 5,441,017 A * | 8/1995 | Lindsay | A01K 27/003 119/161 |
| 5,447,227 A * | 9/1995 | Kosberg | A01K 1/035 206/223 |
| 5,718,192 A | 2/1998 | Sebastian | |
| 5,727,500 A | 3/1998 | Conboy | |
| 5,890,637 A * | 4/1999 | Furneaux | A01K 27/001 224/191 |
| 6,019,067 A * | 2/2000 | Carey | A01K 27/006 119/795 |
| 6,035,809 A | 3/2000 | Fingerett et al. | |
| 6,085,695 A | 7/2000 | Miller et al. | |
| 6,199,737 B1 * | 3/2001 | Ringelstetter | E01H 1/1206 150/108 |
| 6,237,533 B1 | 5/2001 | Rodriguez | |
| 6,257,473 B1 * | 7/2001 | Ringelstetter | E01H 1/1206 119/795 |
| 6,314,917 B1 | 11/2001 | Ryan | |
| 6,418,881 B1 | 7/2002 | Starratt | |

(Continued)

FOREIGN PATENT DOCUMENTS

| | | | | |
|---|---|---|---|---|
| AU | 2007101121 A4 * | 5/2008 | | A01K 29/00 |
| KR | 20140131890 A * | 11/2014 | | A01K 29/00 |

*Primary Examiner* — Andrea Valenti
(74) *Attorney, Agent, or Firm* — Lewis Roca Rothgerber Christie LLP

(57) ABSTRACT

A waste disposal device includes a waste container having a first compartment and a second compartment and a leash connected to the waste container at each of a first location of the waste container and a second location of the waste container, such that a portion of the leash between the first location and the second location define a first handle. The waste container may include an opening in a surface of the waste container that exposes a portion of the second compartment. The first compartment may further include a liner. The leash may further have a second handle at a location apart from the first handle.

17 Claims, 14 Drawing Sheets

(56) References Cited

U.S. PATENT DOCUMENTS

| | | | |
|---|---|---|---|
| 7,367,286 B2 | 5/2008 | Beaupre | |
| 8,002,115 B2 * | 8/2011 | Rappaport | A45C 3/06 |
| | | | 150/112 |
| 8,256,384 B2 | 9/2012 | Wheeler et al. | |
| 8,347,825 B2 | 1/2013 | Lopez et al. | |
| 9,078,417 B1 * | 7/2015 | Lees | A45F 5/021 |
| 2003/0111022 A1 | 6/2003 | Woolley et al. | |
| 2006/0125255 A1 | 6/2006 | Bell | |
| 2006/0219188 A1 * | 10/2006 | Beaupre | A01K 27/006 |
| | | | 119/795 |
| 2008/0179902 A1 | 7/2008 | Phillips et al. | |
| 2009/0095225 A1 * | 4/2009 | O' Connell | A01K 27/006 |
| | | | 119/161 |
| 2010/0269769 A1 * | 10/2010 | Schoeneberg | F01L 1/047 |
| | | | 123/90.6 |
| 2010/0300375 A1 | 12/2010 | Yang | |
| 2011/0011504 A1 * | 1/2011 | Steinbacher | A01K 27/006 |
| | | | 150/106 |
| 2011/0180016 A1 | 7/2011 | Wheeler et al. | |
| 2012/0167834 A1 | 7/2012 | Cummings et al. | |
| 2012/0186539 A1 | 7/2012 | Johnston | |
| 2012/0193386 A1 * | 8/2012 | McFarland | A45C 3/00 |
| | | | 224/666 |
| 2012/0234251 A1 * | 9/2012 | Harlan | A01K 1/01 |
| | | | 119/161 |
| 2012/0286003 A1 * | 11/2012 | Shadday | E01H 1/1206 |
| | | | 224/191 |
| 2013/0026726 A1 * | 1/2013 | Thomas | A45C 5/14 |
| | | | 280/43.1 |
| 2014/0212072 A1 * | 7/2014 | Mackey | A01K 27/008 |
| | | | 383/38 |
| 2015/0375933 A1 * | 12/2015 | First | A45F 3/00 |
| | | | 206/38 |

* cited by examiner

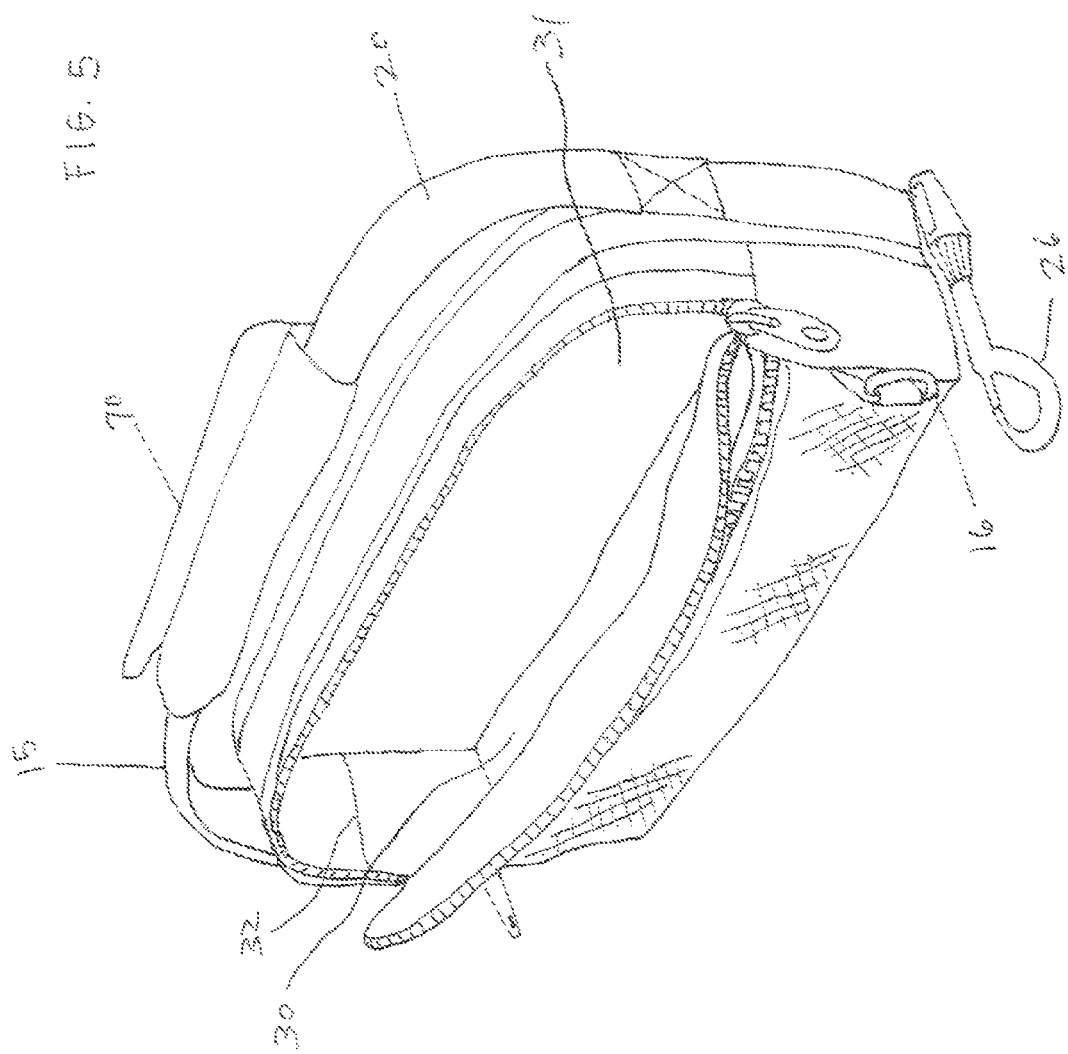

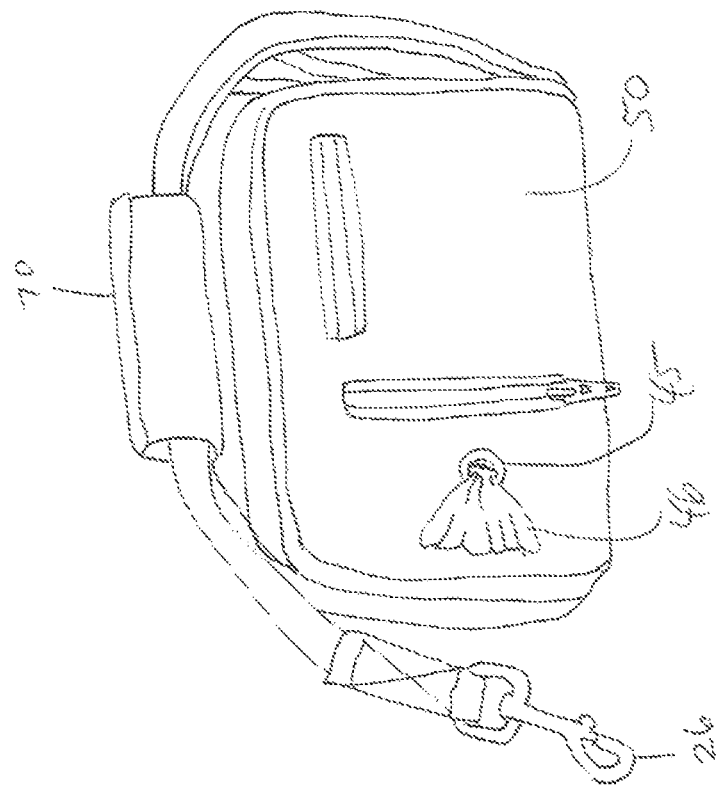
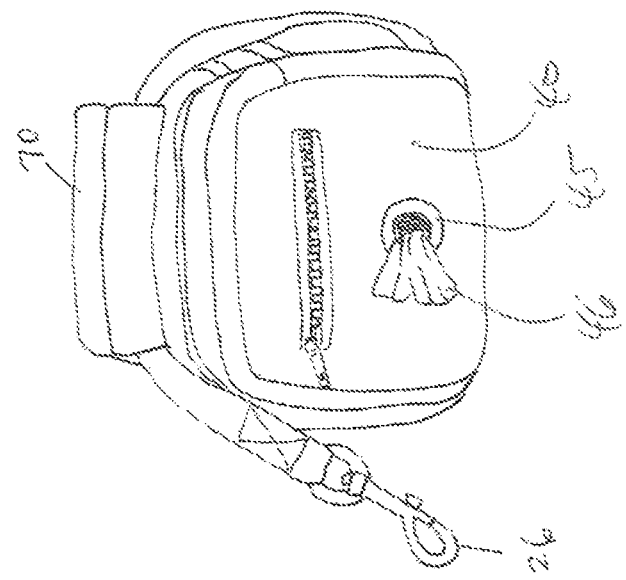
FIG. 9

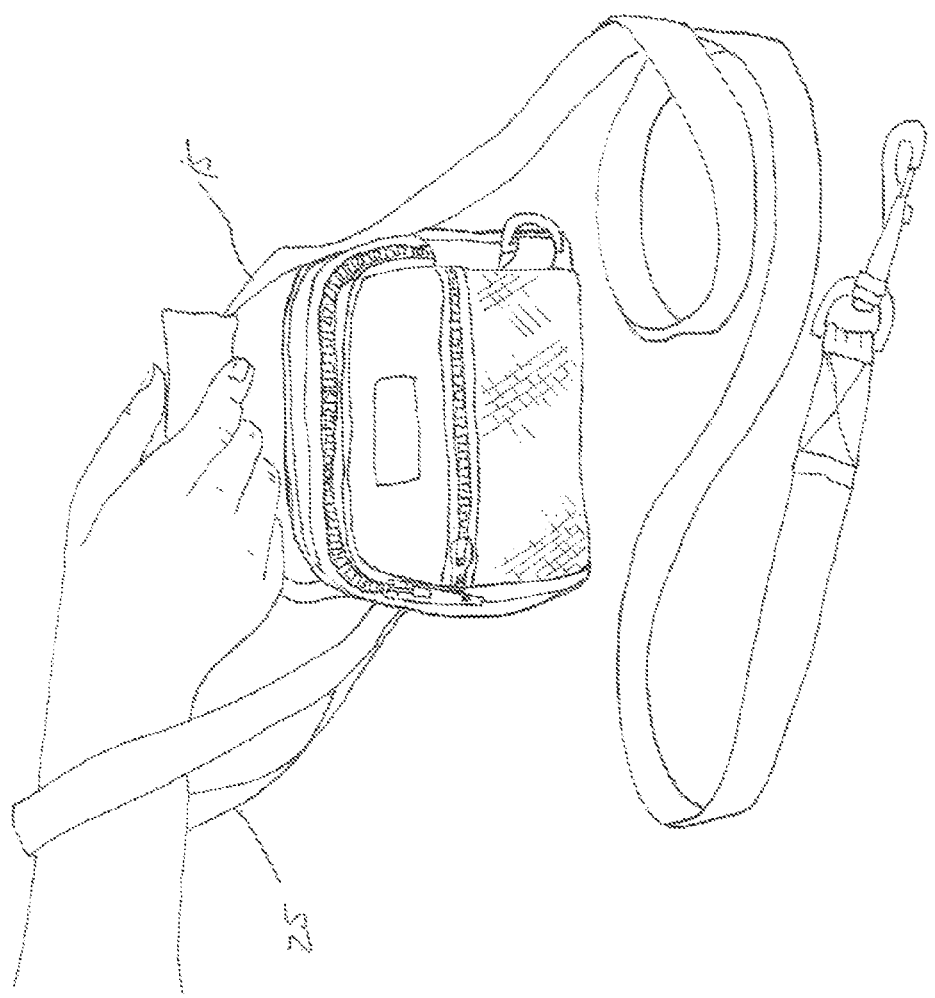

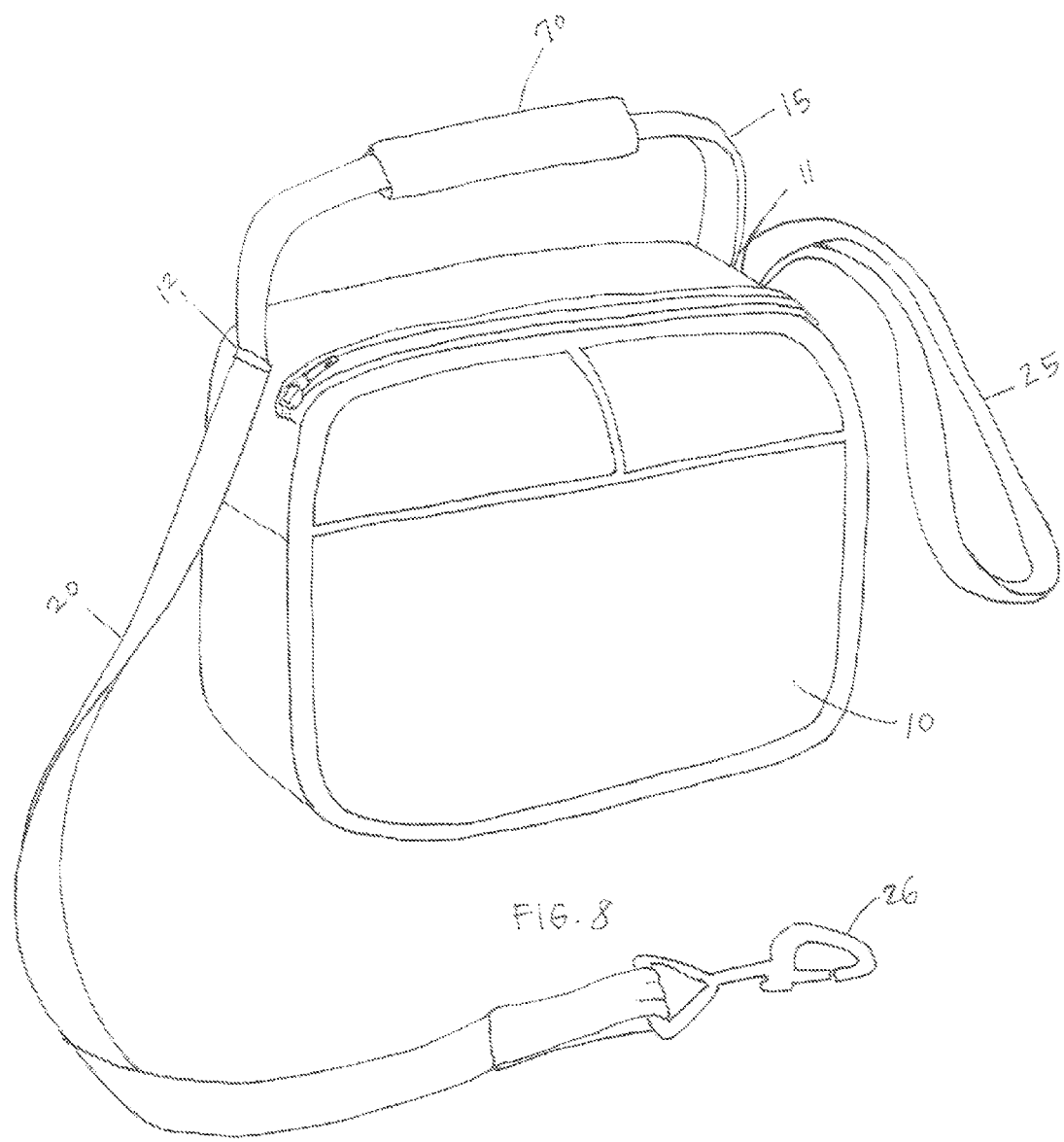

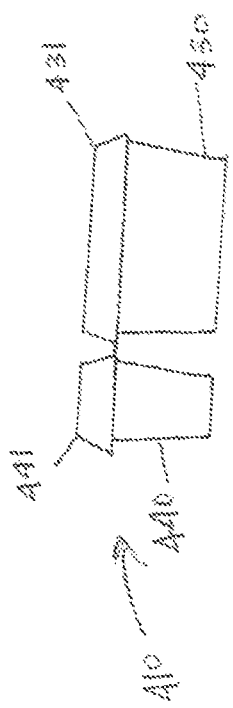
FIG. 13C
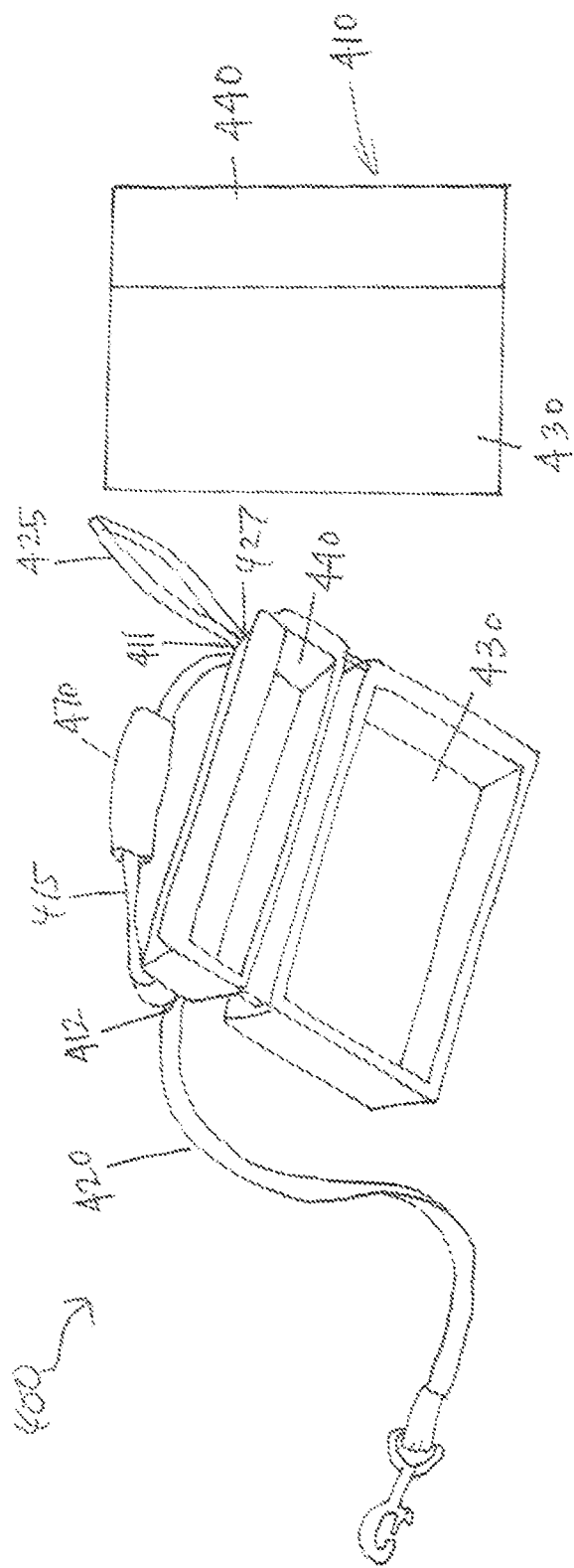
FIG. 13B
FIG. 13A

WASTE DISPOSAL AND STORAGE DEVICE

CROSS-REFERENCE TO RELATED APPLICATION

The present application claims the benefit of U.S. Provisional Application No. 62/082,082, filed on Nov. 19, 2014, entitled "WASTE DISPOSAL DEVICE," the entire content of which is incorporated herein by reference.

BACKGROUND

Many pet owners walk their pet using a leash. Responsible pet owners typically carry a waste bag or similar material for picking up waste generated by the animal. Pet owners also often carry personal belongings when walking their pet, such as a mobile phone, keys, or money.

When an animal generates waste during a walk, the pet owner often needs to isolate an unused waste bag and bend over or kneel to retrieve the waste, while still maintaining control over the animal and without dropping any personal belongings or exposing the personal belongings to the waste. The pet owner must then typically carry the used waste bag for the remainder of the walk or until the pet owner locates a trash receptacle. The pet owner typically must hold the leash and any remaining unused waste bags in one hand, and the used waste bag in a separate hand to minimize interaction between the used waste bag and the leash and the unused waste bags, thereby limiting exposure of the leash and unused waste bags to the retrieved waste. As such, the pet owner has limited capacity to carry any personal belongings. Further, the used waste bag is not carried discretely and may emit unpleasant odors during the remainder of the walk.

Accordingly, there is a need for a waste disposal device that allows for the pet owner to retrieve and store pet waste in a discrete and sanitary manner. Further, there is a need for a waste disposal device that allows a user to hold a used waste bag and a leash in the same hand while minimizing the likelihood that the leash will be exposed to the retrieved waste. Additionally, there is a need for a waste disposal device that allows for the storage of unused waste containers and used, waste containers without exposing the unused waste containers to retrieved waste. Also, there is a need for a device that is configured to allow a user to firmly and comfortably hold the leash, the unused waste containers, and any used waste containers.

SUMMARY

The present disclosure relates generally to the field of carrying, storing, and disposing of animal waste, and more particularly to a waste disposal device that may be used to temporarily carry used waste bags containing animal waste retrieved while walking an animal in a sanitary and discrete manner. In particular, the present disclosure relates to a waste disposal device including a leash and a waste container that has a compartment for receiving and containing the waste. In one embodiment of the present disclosure, the waste disposal device includes a waste container with a compartment for receiving and containing waste having a liner, a compartment for containing/dispensing bags, and an opening in the waste container exposing a portion of the second compartment, and a leash connected to the waste container at a first location and at a second location to form a first handle, and wherein the leash also includes a second handle.

In one or more embodiments, the waste container further includes a third compartment for storing personal belongings.

In one or more embodiments, the waste container further includes a fourth compartment for storing personal belongings.

In one or more embodiments, the waste container is constructed from a hard material. In other embodiments, the waste container is constructed from a soft material in one or more embodiments wherein the waste container is constructed from a soft material, the second compartment of the waste container includes a liner. In other embodiments, the waste container is constructed of a combination of hard material and soft material.

In one or more embodiments of the present disclosure, the compartments may have one or more hinged doors. In other embodiments, the compartments may be opened and closed by other means, such as a slidable door or a zipper. In one or more embodiments, the compartments may be opened and closed by the same means, i.e., the first and second compartments are both accessed by a zipper.

In one or more embodiments, the leash may be formed integrally with the waste container. In one or more embodiments, the leash may be connected at a first location on a first surface of the waste container and at a second location on the first surface of the waste container. In one or more embodiments, the leash may be connected at the first location at a base of the second handle.

BRIEF DESCRIPTION OF THE DRAWINGS

These, and other features and advantages of embodiments of the present disclosure will be better understood by reference to the following detailed description, when considered in conjunction with the accompanying drawings. The same numbers are used throughout the figures to reference like features and components.

FIG. 5 is a perspective view of an embodiment of a waste disposal device comprising a first compartment comprising a liner.

FIG. 6 is a back view of a waste disposal device with a waste container comprising an opening a surface of the waste container exposing a portion of the second compartment.

FIG. 7 is an image of a hand of user holding the waste disposal device of FIG. 6.

FIG. 8 is a perspective view of another embodiment of a waste disposal device of the present disclosure.

FIG. 13A is a perspective view of another embodiment of a waste disposal device of the present disclosure.

FIG. 13B is a top view of the waste container of FIG. 13A.

FIG. 13C is a side elevation, view of the waste container of FIG. 13A in a closed position.

DETAILED DESCRIPTION

Figure 1:
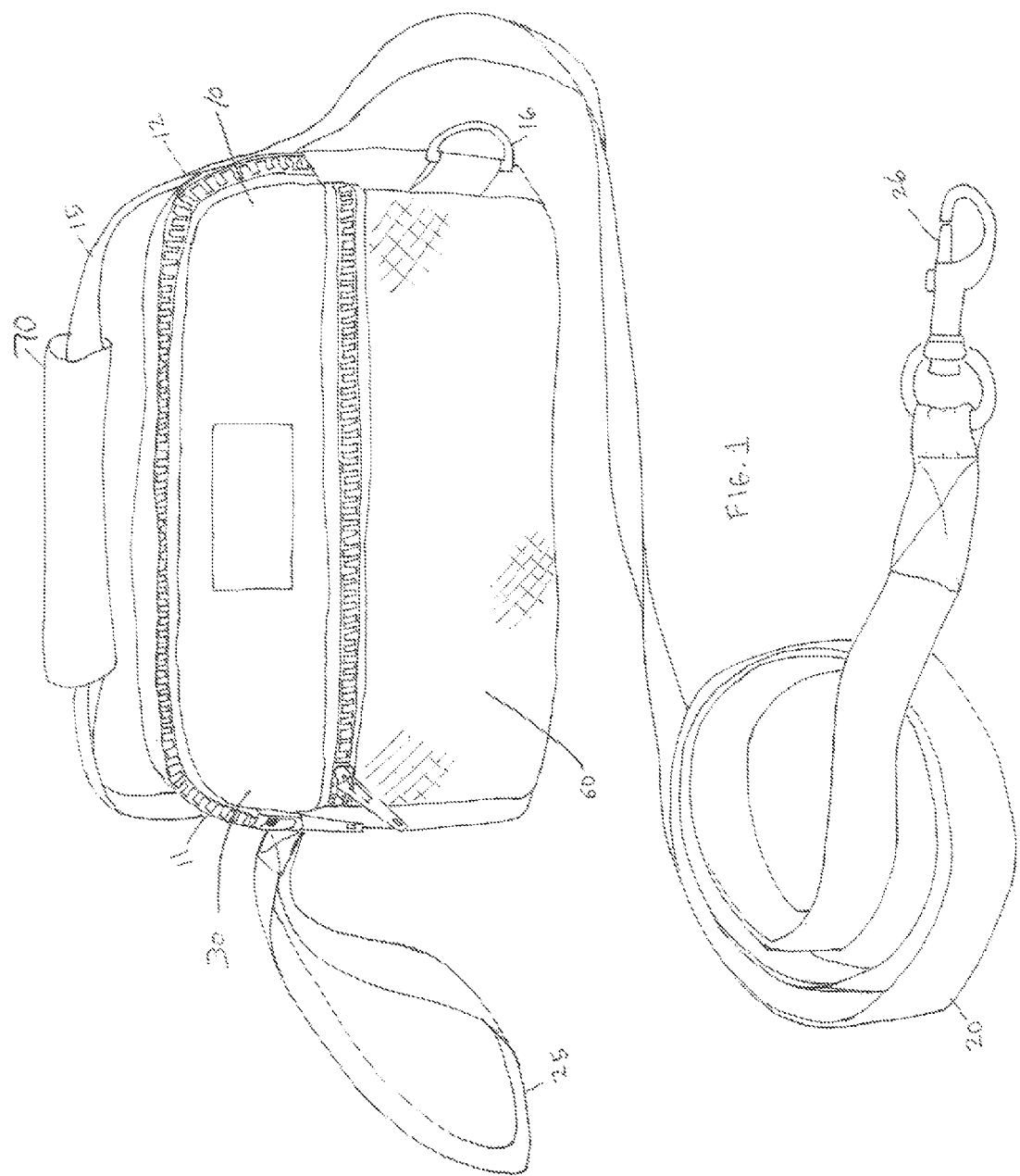
FIG. 1 is a front elevation view of an embodiment of a waste disposal device of the present disclosure.

The present disclosure relates to a waste container that has a compartment for receiving and containing animal waste and that is attached or attachable to a leash. The drawings depict some example embodiments as applied to a waste disposal device for illustrative purposes only, and it will be apparent that the present disclosure may also be used in other applications in the same or similar fields.

Referring now to an example embodiment illustrated in FIGS. 1 through 5, a waste disposal device 100 includes a waste container 10 and a leash 20. The waste container 10 includes a first compartment 30 (for storing animal waste), and a second compartment 40 (for storing, for example, unused bags that may be used to retrieve animal waste). The waste container 10 also includes an opening 45 in a surface of the waste container 10 that exposes a portion of the second compartment 40. The leash 20 is connected to the waste container 10 at a first location 11 on a surface of the waste container 10 and at a second location 12 on a surface of the waste container 10 to form a first handle 15. The leash 20 further includes a second handle 25.

In one or more embodiments, the first compartment 30 has a liner. In one or more embodiments, the second compartment 40 has a liner. In one or more embodiments, the first compartment 30 has a liner, but the second compartment 40 does not have a liner. Alternately, in other embodiments, the second compartment 40 has a liner, hut the first compartment 30 does not have a liner. In yet other embodiments, neither the first compartment 30 nor the second compartment 40 has a liner. In one or more embodiments, both the first compartment 30 and the second compartment 40 have liners.

The first compartment 30 of the waste container 10 may be defined by an opening in a surface of the waste container 10 and a liner 31, as shown in FIG. 5. In one or more embodiments, the opening that defines the first compartment 30 may extend in a length direction along the entire length of the surface of the waste container 10. In other embodiments, the opening that defines the first compartment 30 may extend in a length direction along a portion of the surface of the waste container 10. In other embodiments, the opening that defines the first compartment 30 may extend in a height direction along all or a portion of the surface of the waste container 10. In other embodiments, the opening that defines the first compartment 30 may extend in a length direction along the entire length of the surface of the waste container 10 and in a height direction along a portion of the surface of the waste container 10 and/or another surface of the waste container 10.

The opening that defines the first compartment 30 may be closable. For example, the waste container 10 may further include a zipper that closes the opening that defines the first compartment 30, as illustrated in FIG. 5. In other embodiments, the waste container 10 may include a snap, magnet, button, hook-and-loop type fastener, or other means for fastening the opening that defines the first compartment 30.

In other embodiments, the First compartment 30 may be defined by a door. For example, a surface of the waste container 10 may be a hinged door that is closable and encloses the first compartment. In other embodiments, a surface of the waste container 10 may be a sliding door that slides to expose the first compartment 30. In other embodiments, a surface of the waste container 10 may be completely removable from the waste container 10, such that the surface may be removable from the waste container to expose the first compartment 30. In yet other embodiments, a portion of a surface of the waste container 10 may be a door.

As shown in FIG. 5, in one or more embodiments, the first compartment 30 contains a liner 31. The liner 31 may be a vinyl or plastic material. In one or more embodiments, the first compartment 30 has a liner 31 that can be easily wiped or washed, for example, if exposed to any waste. The liner 31 also helps to protect the surfaces of the waste container 10 from undesirable stains or exposure to the retrieved waste or other objects stored in the first compartment 30. In one or more embodiments, the liner 31 may be removable from the waste container 10. In other embodiments the liner 31 may be affixed to the waste container 10. Further, in an embodiment, a pocket 32 may be located inside the first compartment and may contain a device, such as an activated carbon packet, to reduce or absorb odors.

Figure 2:
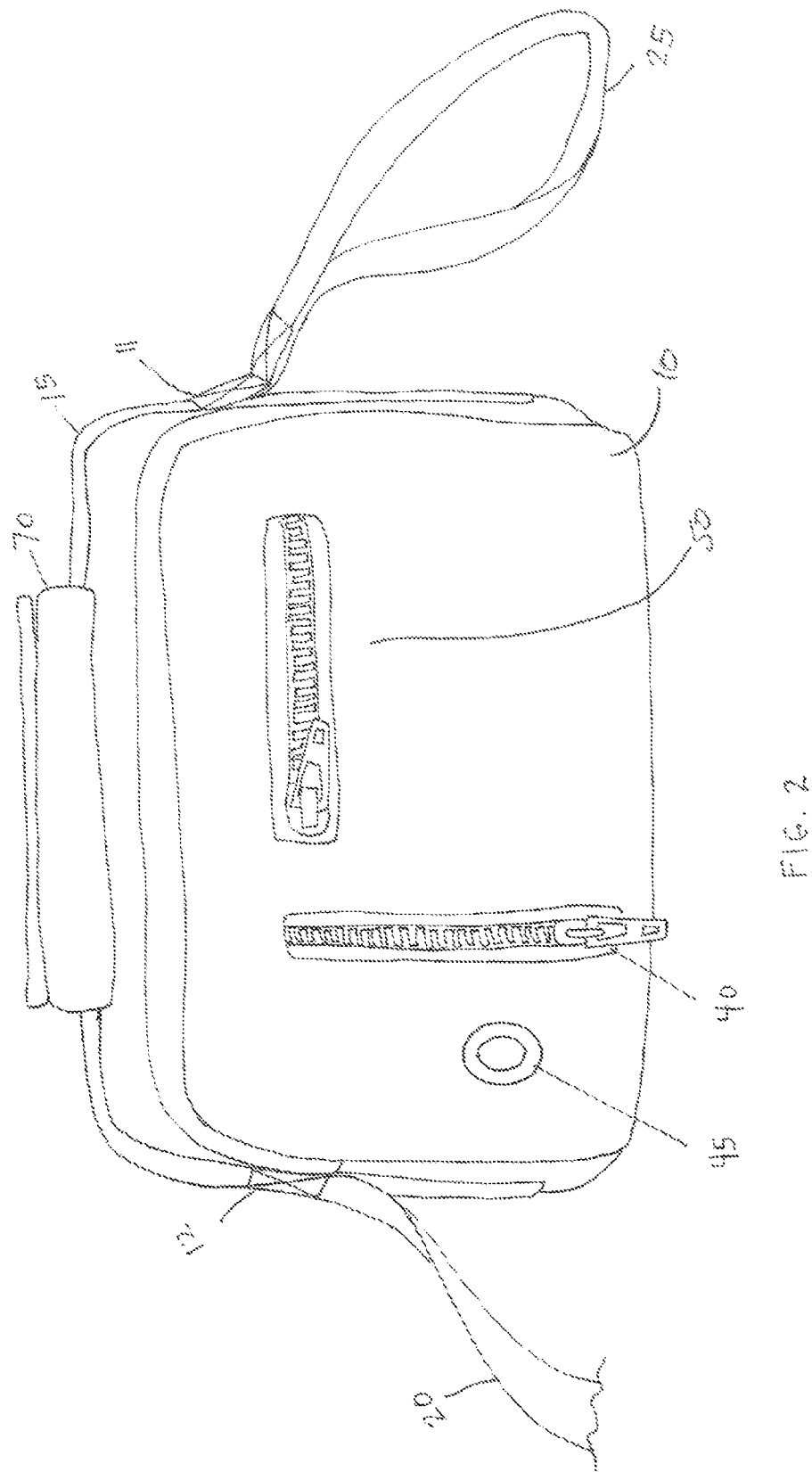
FIG. 2 is a back elevation view of the waste disposal device of FIG. 1.

Turning to FIGS. 2 and 6, the waste container 10 further includes a second compartment 40. The second compartment 40 may be defined by an opening in a surface of the waste container 10 and a liner. In one or more embodiments, the opening that defines the second compartment 40 may extend in a length direction along the entire length of the surface of the waste container 10. In other embodiments, the opening that defines the second compartment 40 may extend in a length direction along a portion of the surface of the waste container 10. In other embodiments, the opening that defines the second compartment 40 may extend in a height direction along all or a portion of the surface of the waste-container 10. In other embodiments, the opening that defines the second compartment 40 of the waste container 10 may extend in a length direction along the entire length of the surface of the waste container 10 and in a height direction along a portion of the surface of the waste container 10 and/or another surface of the waste container 10.

The first compartment 30 and the second compartment 40 may each be defined by an opening in the same surface of the waste container 10. In other embodiments, the first compartment 30 and the second compartment 40 may each be defined by an opening in different surfaces of the waste container 10. In other embodiments, the first compartment 30 and the second compartment 40 may be defined by the same opening and include a partition or separate liners.

As discussed above with respect to the first compartment 30, the opening that defines the second compartment 40 may be closable by any suitable means for fastening, such as a zipper, button, snap, magnet, etc. Further, the opening that defines the second compartment 40 may be a door, as discussed above with respect to the first compartment 30.

The second compartment 40 may also include a liner. The liner may be polyester, denim, vinyl, or other suitable material. The liner serves to separate the second compartment from the first compartment. The second compartment 40 may be large enough to contain a roll, stack, or other configuration of bags or other material for retrieving and storing animal waste.

Figure 4B:
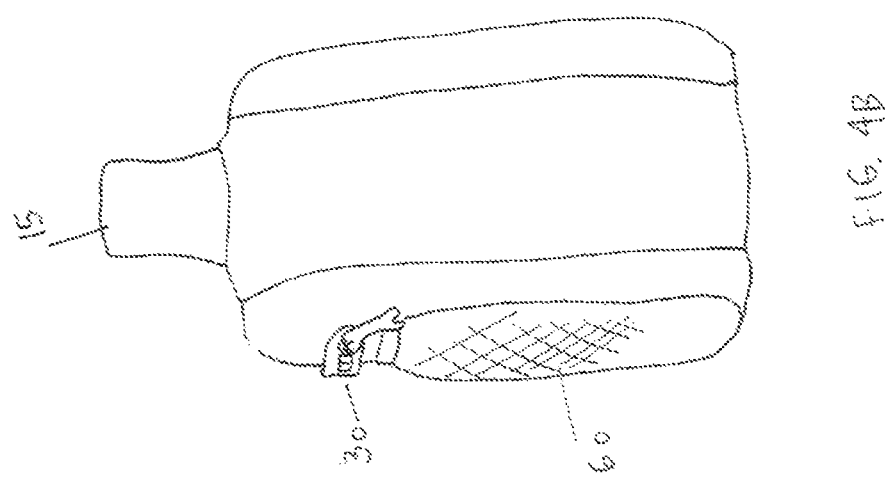
FIG. 4B is a side elevation view of the waste container of FIG. 4A.
Figure 4A:
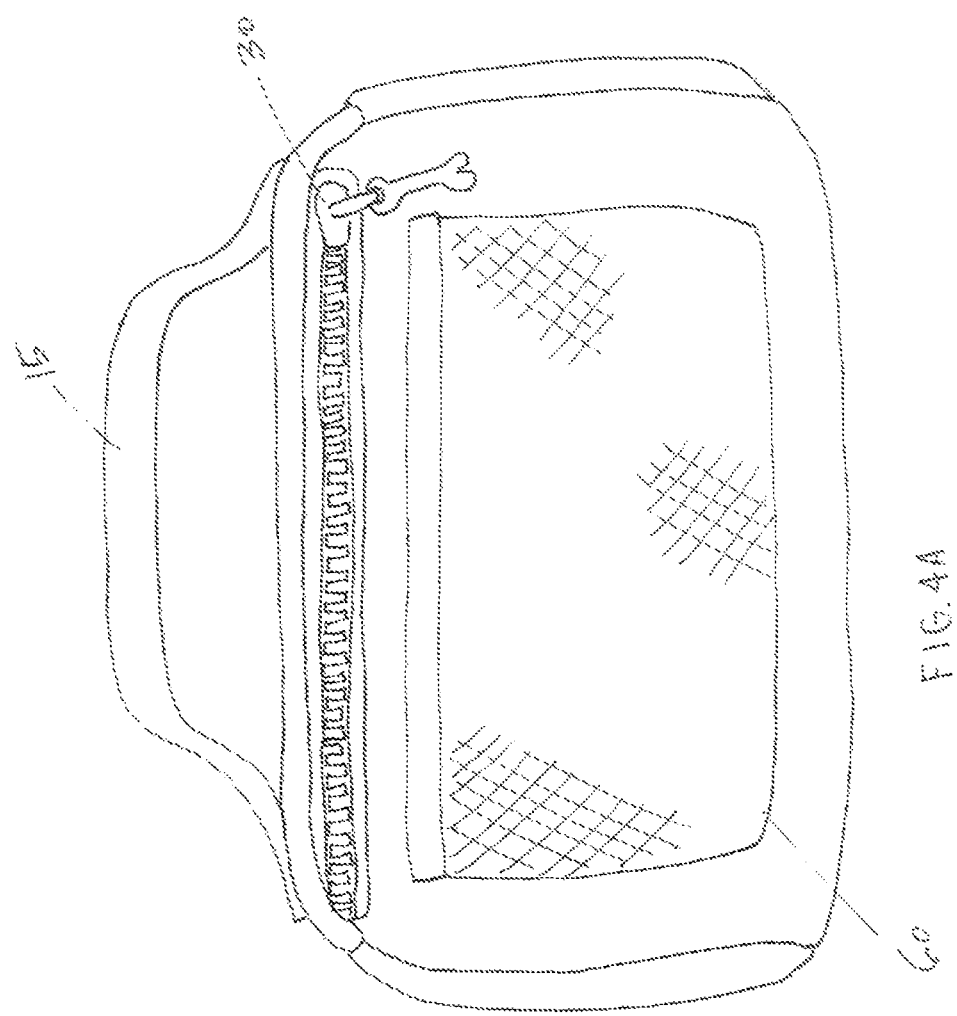
FIG. 4A is a front elevation view of an embodiment of a waste container of the present disclosure.

As show in FIGS. 2, 4A, and 6, in one or more embodiments the waste container 10 further includes an opening 45 in a surface of the waste container 10 that exposes a portion of the second compartment 40. For example, the opening 45 that exposes a portion of the second compartment may be a grommet, as shown in FIG. 6. The opening 45 may be circular, square, or any other shape through which material for retrieving animal waste may pass. The opening 45 may also be metallic, such as a grommet, or it may be plastic or sewn fabric. The opening 45 is aligned with the second compartment 40 such that unused bags or other material for retrieving and storing animal waste may be easily retrieved from the waste container 10. For example, a user may insert a small roll of unused plastic bags into the second compartment 40 and position an end of a bag through the opening to allow for quick and easy removal of the bag without fully exposing the second compartment 40, as shown in FIG. 6.

Figure 3:
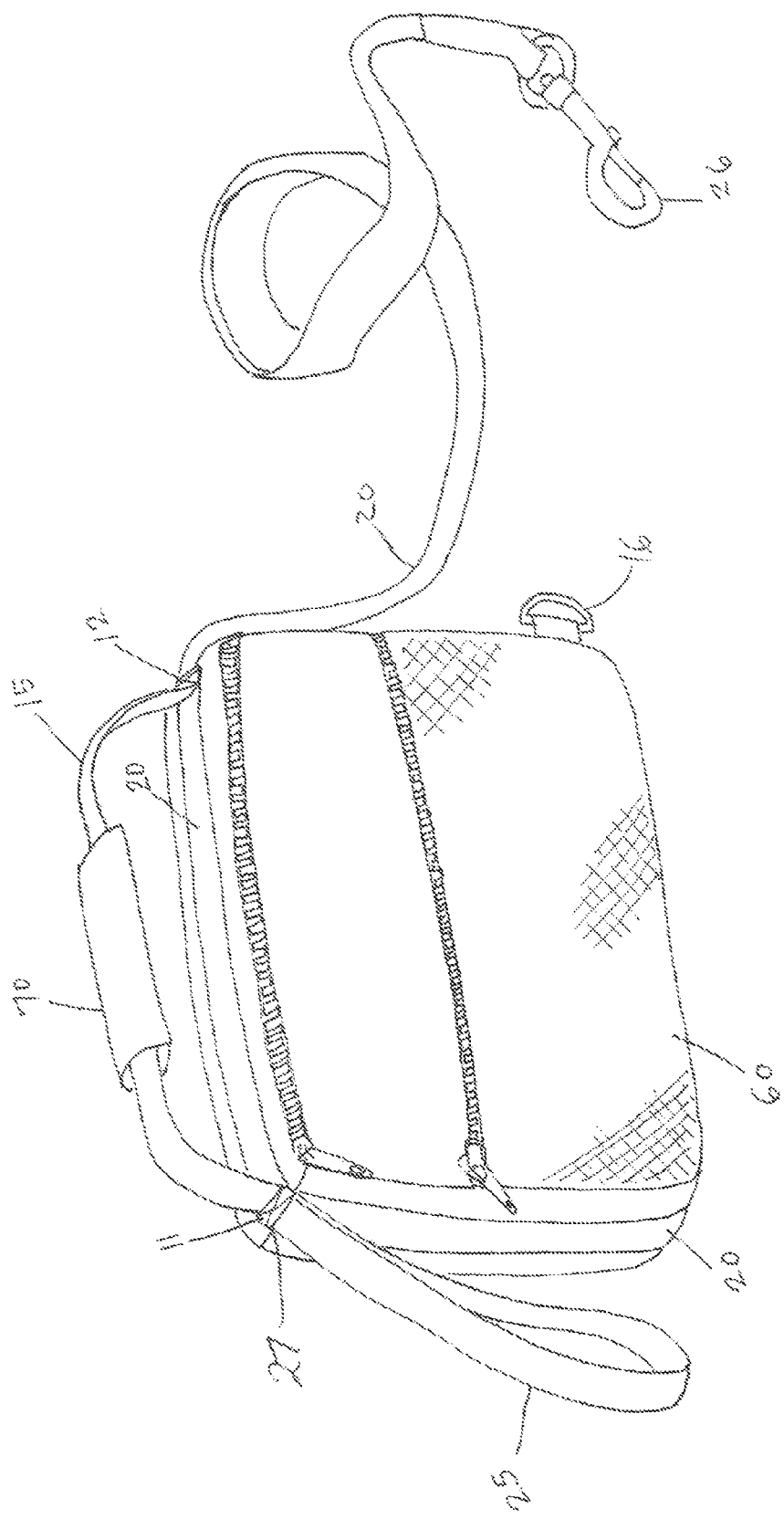
FIG. 3 is a perspective view of an embodiment of a waste disposal device of the present disclosure.

As shown in FIGS. 1-3, the leash 20 may be attached to the waste container at a first location 11 on a surface of the waste container 10 and at a second location 12 on a surface of the waste container 10 such that the leash 20 forms a first handle 15. In one or more embodiments, the leash 20 may be attached to the waste container 10 at a first location 11 and a second location 12 on the same surface of the waste container 10, as shown in FIG. 3. In other embodiments, the leash may be attached to the waste container at a first location on a first surface and at a second location on a second surface. The leash further includes a second handle 25 that is distinct from the first handle 15. In one or more embodiments, the leash 20 is attached to the waste container 10 at a base 27 of the second handle 25. The second handle 25 allows a user to control, the leash 20 via traditional leash carrying methods, such as wrapping the second handle 25 around a wrist, as illustrated in FIG. 7. The first handle 15 allows a user to control the waste container 10. Thus, since embodiments of the present invention include both a first handle 15 and a second handle 25, a user is able to control the leash 20 and an animal on the leash 20 via the second handle 25 and the waste container 10 via the first handle 15 for easy access to the waste container. Further, because the user can use the first handle 15 and the second handle 25 in one hand, the user may easily use a second hand to retrieve an unused waste bag, retrieve animal waste, and store the used waste bag in the waste container 10 without compromising control of the animal on the leash 20.

The waste container 10 of the present disclosure has been described as having two compartments. However, in other embodiments, the waste container may have additional compartments, or may have only one compartment. For example, the waste container may have a third compartment 50. The third compartment 50 may be large enough to carry a set of keys, a cell phone, and/or money, for example. In one or more embodiments, the third compartment 50 may have a liner. In other embodiments, the third compartment 50 may not have a liner. In embodiments wherein the third compartment 50 has a liner, the liner allows for the user to stow personal belongings without exposing the belongings to a used waste bag, and without requiring the user to open the second compartment 40 and expose unused waste bags. An opening to the third compartment 50 may be in the same surface of the waste container 10 as the opening to the second compartment 40. However, in other embodiments, the opening to the third compartment 50 may be in a different surface of the waste container 10 than the second compartment 40. The opening to the third compartment 50 may be closable by any of the means discussed above with respect to the opening of the first or second compartments 30, 40.

In one or more embodiments, the waste container may further include a fourth compartment 60. This fourth compartment 60 may be, for example, a pocket located on a surface of the waste container 10, as illustrated in FIGS. 3, 4A and 4B. The fourth compartment 60 may include a liner. In other embodiments, for example when the fourth compartment 60 has a pocket configuration, the fourth compartment 60 may not include a liner. Instead, an outer surface of the waste container 10 may provide the inner surface of the pocket, and additional material may comprise the outer surface of the pocket, defining the fourth compartment 60 therebetween. In one or more embodiments, the opening that defines the fourth compartment 60 may be closable. The opening to the fourth compartment 60 may be closable by any of the means discussed above with respect to the opening of the first compartment 30.

In one or more embodiments, the fourth compartment 60 may extend along a length of a surface of the waste container 10. The fourth compartment 60 may be configured such that it may contain a user's keys, cell phone, money, and/or other personal belongings. The outer surface of the fourth compartment 60 may be the same material as the waste container 10. In other embodiments, the outer surface of the fourth compartment 60 may be a different material, such as a mesh material.

As shown in FIGS. 1 through 7, in one or more embodiments, the waste container 10 may include four compartments. For example, the first compartment 30 for containing retrieved animal waste may be defined by an opening at the intersection of a front surface and a top surface of the waste container 10. The first compartment 30 may be approximately the same size as the waste container 10, and include a liner 31 made of vinyl. The opening defining the first compartment 30 may be closable by means of a zipper. The opening defining the first compartment 30 may extend in a length direction along the entire length, of the waste container 10, and may extend in a height direction along a portion of the waste container 10 at both ends of the waste container 10. When the opening extends in both the length and the height directions, the opening to the first compartment 30 increases, making it easier for a user to place a used waste bag in the first compartment 30 or to subsequently retrieve the used waste bag. The second compartment 40 may be located on a rear surface of the waste container 10 (opposite the front surface) and contain a fabric liner. As discussed above, the second compartment 40 may be used to store unused waste bags. The second compartment 40 may be defined by an opening that extends in a height direction. The opening defining the second compartment 40 may be closable by a zipper, and may extend about ¾ of the height of the waste container 10 in the height direction. The opening may be positioned in the length direction about ⅓ of the total length from a side of the waste container 10. According to this configuration, an opening 45, or grommet that exposes a portion of the second compartment 40 is defined in the rear surface of the waste container 10. The opening 45 is generally defined at the center of the second compartment 40 to allow for easy alignment of a roll of unused waste bags and easy removal of each waste bag 46 through the opening 45. The third compartment 50 may also be located on the rear surface of the waste container 10 and include a liner. The third compartment 50 may be defined by an opening that extends in the length direction of the waste container 10. The opening defining the third compartment 50 may extend approximately ⅔ of the total length of the waste container 10 and about ¾ of the total height of the waste container 10. The second compartment 40 is adjacent to the third compartment 50 and does not interfere with the third compartment 50. The opening defining the third compartment 50 may be closable by means of a zipper. The third compartment 50 may be used for storage of keys or money. The fourth compartment 60 may be located on the front surface of the waste container 10. The fourth compartment 60 may be a pocket without a liner, such that the front surface of the waste container 10 is the back surface of the fourth compartment 60 and additional material forms the front surface of the fourth compartment 60. The front surface of the fourth compartment 60 may be a mesh material. The fourth compartment may be defined by an opening that is closable by means of a zipper. The opening defining the fourth compartment 60 may extend in a length direction along an entire length of the waste container 10. The fourth compartment 60 may be used to contain personal objects, such as a cell phone, wallet, and/or keys. As discussed, the respective openings that define each compartment 30, 40, 50, 60 are closable. The closable openings allow the user to hold the waste container 10 in a comfortable configuration with minimal concern that any personal belongings or waste bags may fall or otherwise be removed from the waste container 10 while the waste disposal device 100 is in use.

Referring now to FIGS. 1 and 3, the leash 20 may include a clip 26. The clip 26 may be used to attach the waste disposal device 100 to a collar of an animal. The waste container 10 may further include a hoop 16, e.g. a D-loop or a loop. The hoop 16 is configured to receive the clip 26 when the waste disposal device 100 is not attached to an animal. The hoop 16 may be made of metal, fabric, or plastic, for example. The hoop 16 may be located on a surface of the waste container 10, for example the front surface. However, in other embodiments, the hoop 16 may be located on a side surface of the waste container 10, or at the interface of the front surface and the side surface of the waste container 10. In one or more embodiments, the hoop 16 is located at a side of the waste container 10 that is opposite the side of the waste bag in which the second handle 25 is attached. As will be discussed in greater detail below, the hoop 16 may be positioned on the waste container 10 such that when the leash 20 is wrapped around the perimeter of the waste container 10, for example along two revolutions, the clip 26 may be attached to the hoop 16 easily and without leaving excessive slack on the leash 20.

In one or more embodiments, the leash 20 and the waste container 10 may be integrally formed. For example, the leash 20 and the waste container 10 may be sewn together. In other embodiments, the leash 20 may be removable from the waste container 10. For example, the waste container 10 and the leash 20 may be connectable by other means for fastening, such as snap enclosures, a hook-and-loop type fastener, etc.

As shown in FIG. 3, in one or more embodiments, the leash 20 may be attached to the waste container 10 around an entire perimeter of the waste container 10. The leash 20 may further be secured or reinforced at a first location 11 and a second location 12 on the waste container 10, forming the first handle 15. The leash 20 may be sewn or otherwise firmly attached to the waste container 10 around the perimeter to maintain alignment of the leash 20 around the perimeter of the waste container 10. In other embodiments, the leash 20 may be removable from the waste container 10.

A user of the waste disposal device 100 may have a large animal, and another user of the waste disposal device 100 may have a small animal. The user with the large animal may desire a relatively large waste container 10 to contain the waste created by the large animal, while the user with the small animal may desire a relatively short leash 20 to keep the small animal in closer proximity. As discussed briefly above, the dimensions of the waste container 10 and the dimensions of the leash 20 may be interrelated. The base 27 of the second handle 25 may be attached to the top surface of the waste container 10, for example, at an interface of a side surface and the top surface of the waste container 10. The leash 20 may also be attached at an interface of an opposite side surface and the top surface of the waste container 10, forming the first handle 15. The first handle 15 is configured to allow a user to hold the first handle 15. Accordingly, the portion of the leash 20 that, creates the first handle 15 is at least as long as the length of the waste container 10. The dimensions of the waste container 10 are designed such that when the leash 20 completes two revolutions around the perimeter of the waste container 10, the clip 26 of the leash 20 aligns with the hoop 16 on the waste container 10. Thus, for small animals with short leashes, the waste container 10 may be relatively smaller, and for big animals with larger waste, the waste container 10 may be relatively larger and the leash 20 relatively longer.

The waste disposal device 100 may further include a handle cover 70 that covers a portion of the first handle 15. In one or more embodiments, the handle cover 70 may be the same material as the waste container 10. In other embodiments, the handle cover 70 may be plastic or a cloth material, for example. The handle cover 70 may be integrally attached to the first handle 15 or it may be removable from the first handle 15. For example, the first handle 15 may be sewn to the leash 20. The handle cover 15 has a length that extends in the length direction of the waste container 10 and a width that extends in the width direction of the waste container 10. The length of the handle cover 70 may be approximately half the length of the waste container 10. However, in one or more embodiments, the length of the handle cover 70 may be smaller or larger than half the length of the waste container 10. The handle covet 70 is configured to wrap around the width of the leash 20 in the width direction. Thus, a width of the handle cover is at least double the width of the leash 20. The handle cover 70, when wrapped around the leash 20, may be secured by means of a fastening device, such as a hook-and-loop type fastener. For example, when the handle cover 70 is extended, a bottom surface of the handle cover 70 may have a strip of a female side of a hook-and-loop type fastener extending in the length direction on one end of the handle cover 70, and a top surface of the handle cover 70 on the opposite end of the handle cover 70 may have a corresponding strip of a male side of a hook-and-loop type fastener extending in the length direction, such that the hook-and-loop type strips mate at the top of the first handle 15 when the handle cover 70 is wrapped around the first handle 15. In other embodiments, the handle cover 70 may be secured by different fastening means, such as a button, magnet, tie, or any other suitable means.

The handle cover 70 may provide a comfortable grip for the user. The handle covet 70 may also be used to secure the leash when the waste disposal device 100 is not attached to a pet. FIG. 5 provides an example of the waste disposal device 100 in a bundled state. Additionally, in the bundled state, the clip 26 may be engaged with the hoop 16 to maintain the bundled state, although, in FIG. 5, the clip 26 is shown disengaged from the hoop 16. For example, a user may unfasten the handle cover 70 such that is in an open, or unwrapped, position. The user may fold the second handle 25 in a length direction into the handle cover 70 so that it rests along the unwrapped handle cover 70. The user may also wrap the leash 20 around the perimeter of the waste container 10, for example making two revolutions, placing the leash 20 in the unwrapped handle cover 70 once per revolution. The user may then fasten the handle cover 70, thereby securing the folded second handle 25 and the wrapped portions of the leash 20. This allows for compact storage of the waste disposal, device 100 and reduces the risk of tangling or dirtying the leash 20 or exposing it as a hazard, for example as a tripping hazard. Accordingly, the handle cover 70 is configured to receive at least the portion of the leash 20 that comprises the first handle 15. In one or more embodiments, the handle cover 70 may have a width great enough to receive the second handle 25. In other embodiments, the handle cover 70 may have a width great enough to receive the second handle 25 and one or more revolutions of the leash 20. FIGS. 1 and 3 illustrate the waste disposal device 100 in an unbundled state.

In one or more embodiments, the waste container 100 may be a soil material. For example, the exterior fabric may be denim, polyester, cotton, or other soft fabric. In one or more embodiments, the exterior fabric may be a waterproof washable, or odor resistant material. In one or more embodiments, the waste container 100 may be a hard material as shown in the example embodiment of FIG. 8. For example, the surfaces of the waste container may be plastic or polyvinyl chloride (PVC) or other suitable material. In one or more embodiments, the waste container 100 may be a hard material that is covered with a soft material, such as a fabric.

Referring now to FIG. 8, in one or more embodiments, the leash 20 may be attached to the waste container 10 at a first location 11 and a second location 12 on the same surface of the waste container 10, forming the first handle 15. The leash 20 and the waste container 10 may be attached at the first location 11 and the second location 12 by any suitable means for attachment, such as an adhesive, a snap enclosure, a tie, a magnet etc. The means for attachment at the first location 11 and the second location 12 should be secure, such that the first handle 15 is generally a fixed length, i.e., the leash 20 is not slidable at the second location 12 after the leash 20 has been attached to the waste container 10. In some embodiments, the leash 20 may be permanently affixed to the waste container 10 at the first location 11 and the second location 12, by means of a permanent adhesive, for example.

Figure 9B:
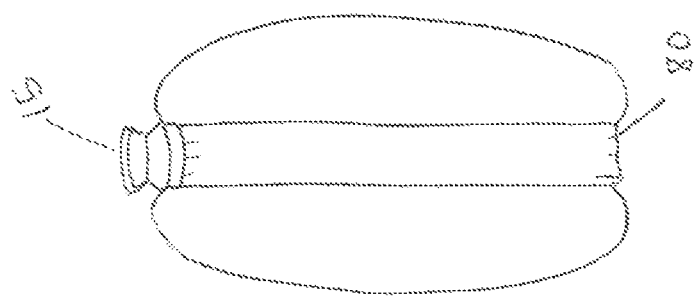
FIG. 9B is side elevation view of the waste container of FIG. 9A.
Figure 9A:
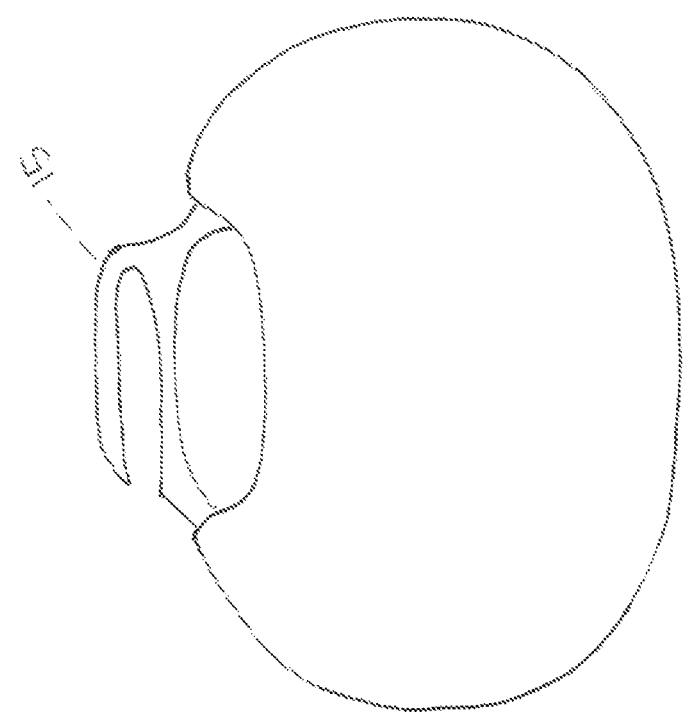
FIG. 9A is a front elevation view of another embodiment of a waste container of the present disclosure.

In one or more embodiments, the waste container 100 may have a groove 80 along the side surfaces and the bottom surface of the waste container 100 that may guide the leash when the leash is wrapped around the waste container 100, as shown in FIG. 9B.

In one or more embodiments, the waste container 10 may be reinforced along the bottom surface, such that the waste container 10 may rest upright.

Figure 10:
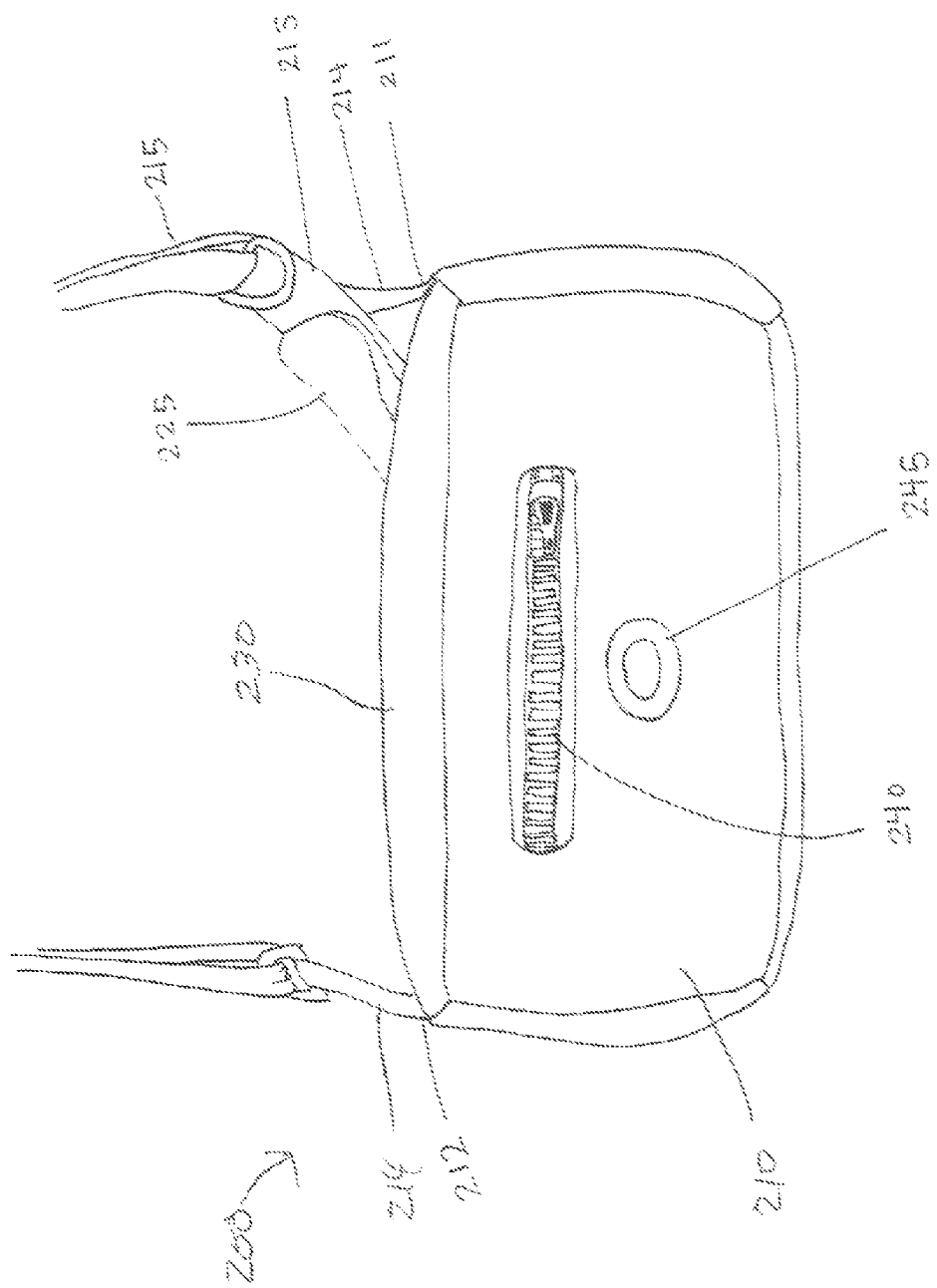
FIG. 10 is an image of another embodiment of the waste disposal device of the present disclosure.

As shown in FIG. 10, in one or more alternate embodiments, a waste disposal device 200 may include a waste container 210 with two compartments 230, 240 and a leash 220. A first compartment 230 is defined by an opening in a top surface of the waste container 210 and the first compartment 230 may be lined. The first compartment 230 is designed to contain retrieved animal waste. A second compartment 240 may be defined by an opening in a front surface of the waste container 210. The second compartment 240 may also be lined. The front surface of the waste container 210 includes an opening 245, such as a hole or a grommet, that exposes a portion of the second compartment 240. The opening 245 is aligned at or near the center of the second compartment 240 such that when a roll or stack of waste bags are placed in the second compartment 240, the bags may be easily removed one at a time. The first and second compartments 230, 240 may both be closable by means of a zipper. The opening defining the first compartment 230 may extend an entire length of the waste container 210 in a length direction. The opening defining the second compartment 240 may extend a portion of the length of the waste container 210 in a length direction. The waste disposal device 200 may further include a first handle 215. The first handle 215 may be attached to the waste container 210 at a first location 211 on the top surface of the waste container and at a second location 212 on the top surface of the waste container. The first handle may be integrally formed with the waste container, or it may be attachable and removable by means of two clips 213. When the first handle 215 is attachable and removable by means of two clips 213, the waste container 210 may further include a loop 214 at each end of the top surface of the waste container 210, wherein the loops 214 and the clips 213 may be coupled, respectively. The clip opening defined by the clip 213 is wide enough to allow for insertion or removal of a handle 225 of the leash 220. In alternate embodiments, the leash 220 may be integrally formed with the waste disposal device 200. The waste container 210 and the first handle 215 may be the same material, or alternately may be different materials. For example, the waste container 210 may be a soft material such as denim or cotton fabric, or leather. The first handle 215 may also be a soft material such as denim, cotton fabric, or leather. The liner in the first compartment and the liner in the second compartment may be the same material, or alternately may be different materials. For example, the liner of the first compartment may be vinyl or plastic or another material that is easily washed or wiped. The liner of the second compartment 240 may be vinyl, plastic, polyester, cotton, denim, or any other fabric.

Figure 11:
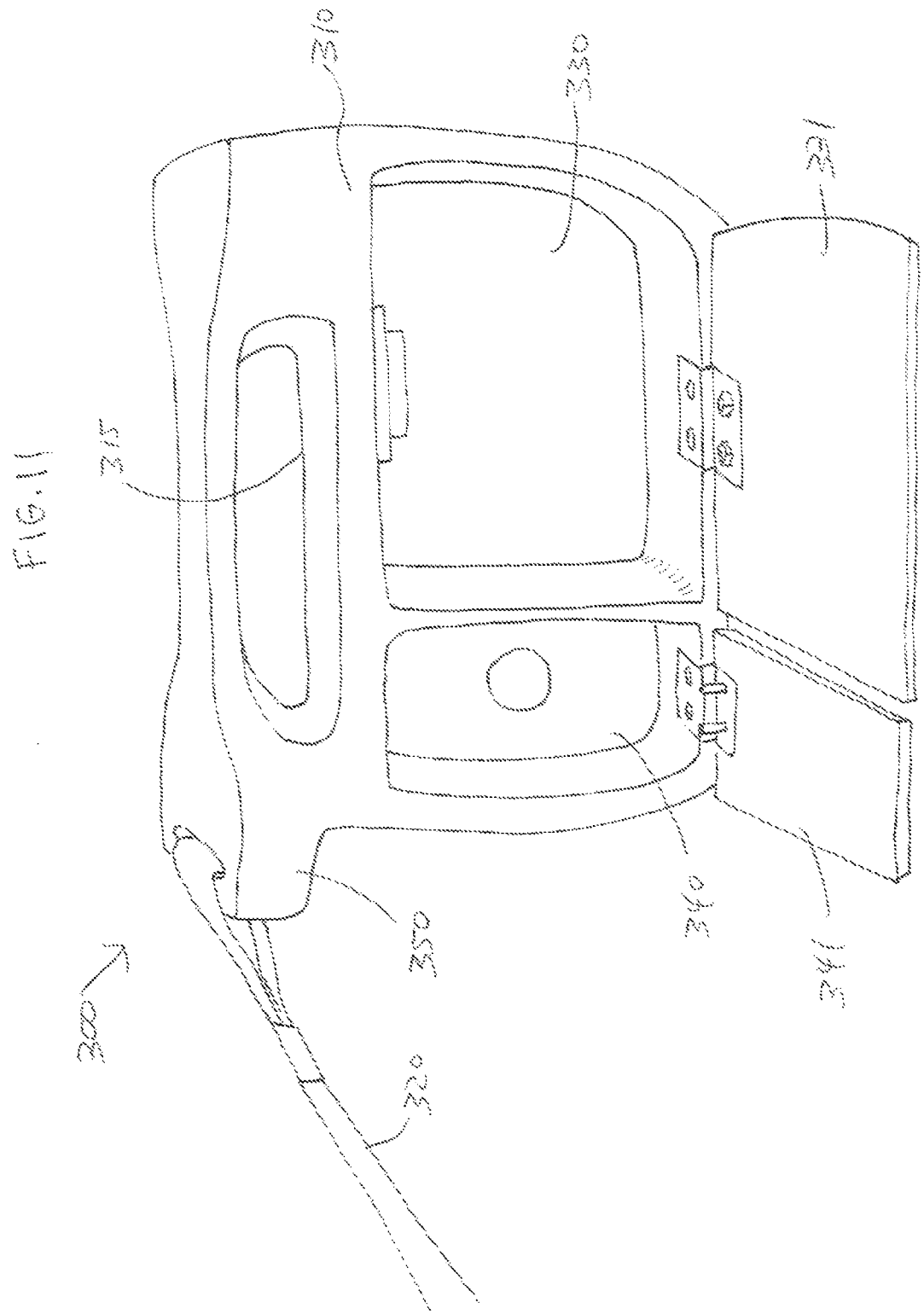
FIG. 11 is an image of another embodiment of the waste disposal device of the present disclosure.
Figure 12:
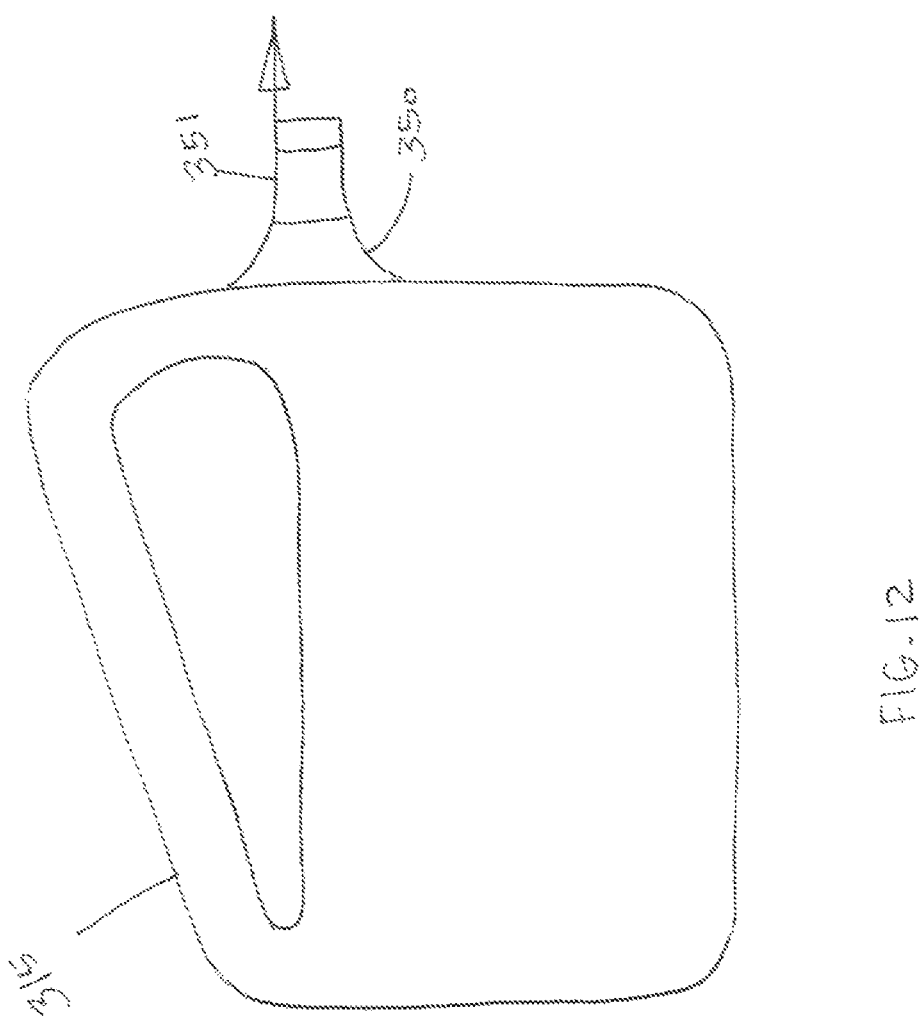
FIG. 12 is a front elevation view of another embodiment of a waste container of the present disclosure.
Figure 13D:
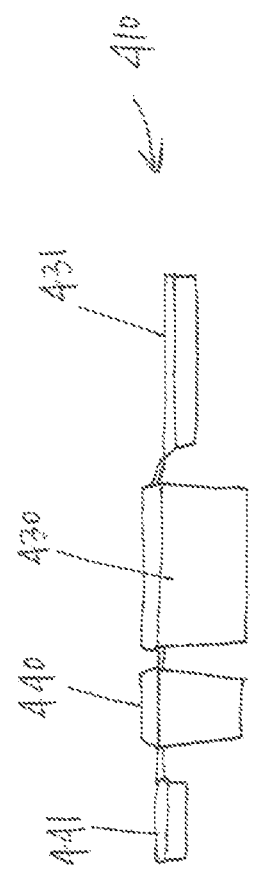
FIG. 13D is a side elevation view of the waste container of FIG. 13A in an open position.

As shows in FIGS. 11 and 12, in one or more alternate embodiments, the waste disposal device 300 may include a waste container 310 and a leash 320. The waste container 310 may be a hard material, such as a plastic or PVC. The waste container 310 may include a first compartment 330, a second compartment 340, and a first handle 315. The first compartment 330 may be defined by an opening in a front surface of the waste container 310. The opening of the first compartment 330 may be closable by means of a first door 331. In one or more embodiments, the first door 331 may be slidable or hinged. The first door 331 may be fastened to the waste container 310 by means of a magnet snap, hook-and-loop type fastener, or other means for fastening. The first compartment 330 may extend in a width direction of the waste container 310 and along a portion of a length direction of the waste container 310. The first compartment 330 may include a liner. The second compartment 340 may also be defined by an opening in a front surface of the waste container 310. The second compartment 340 may be closable by means of a second door 341. The second door 341 may be fastened to the waste container 310 by means of a magnet, snap, hook-and-loop type fastener, or other means for fastening. In one or more embodiments, the second door 341 may be slidable or hinged. In one or more embodiments, the first door 331 may expose both the first compartment 330 and the second compartment 340, such that there is no second door. The second compartment 340 may extend in the width direction of the waste container 310 and along a portion of the length direction of the waste container 310. The second compartment 340 is smaller than the first compartment 330. The second compartment 340 is generally configured to contain a roll of unused waste bags, and the first compartment 330 is generally configured to contain a used waste bag. The first handle 315 is integral with the waste container 310 and extends along the length direction of the waste container 310. The first handle 315 defines a handle opening between the first handle 315 and the waste container 310 such that a hand may grip the first handle 310. In one or more embodiments, the handle opening is generally uniform. In other embodiments, the first handle 315 is oriented on an incline such that the handle opening is larger in a height direction at one end of the waste container 310 and is smaller in a height direction at another end of the waste container 310, as shown in FIG. 12. The waste container 310 further includes a peg 350 through which the leash may be attached. In one or more embodiments, the peg 350 may be aligned at the top of the first handle 315. For example, the peg 350 may extend in the length direction beyond a side surface of the waste container 310 as an extension of a top surface of the first handle 315. In other embodiments, the peg 350 may be aligned at the bottom of the first handle 315, or at the top surface of the waste container 310. For example, the peg 350 may extend in the length direction beyond the side surface of the waste container 310 as an extension of the top surface of the waste container 310, or at the bottom surface of the first handle 315. In other embodiments, the peg 350 may be positioned in the height direction at any location along the side surface. The peg 350 includes a peg opening 351. The leash 320 attaches via the peg opening 351. The peg opening 351 may be square, round, elliptical, or any shape that allows for connection of the leash 320. The leash 320 may be integrally attached to the waste container 310 via the peg opening 351, or the leash 320 may be attachable and removable. In one or more embodiments, the first handle 315 may be formed in a novelty shape, such as a bone or a dog shape.

In one or more embodiments, as shown in FIGS. 13A-D, the waste disposal device 400 may include a waste container 410 in a clam shell configuration, having a first compartment 430, a second compartment 440 and a leash 420. The waste container 410 may be a hard material such as plastic or PVC. The first compartment 430 and the second compartment 440 may be adjacent each other. The first compartment 430 may be defined by an opening in a front surface of the waste container 410. The opening that defines the first compartment 430 may be closable by means of a first door 431, e.g. a lid. The first door 431 may be hinged at an interface of a top surface and the front surface of the waste container 410, or it may be completely removable. The first door 431 may be closable by means of an interference fit, snap enclosure, or other means for fastening. Similarly, the second compartment 440 may be defined by an opening in a front surface of the waste container 410. The opening that defines the second compartment 440 may be closable by means of a second door 441, e.g. a lid. The second door 441 may be hinged about an interface of a bottom surface and the front surface of the waste container 410, or it may be completely removable. The second door 441 may be closable by means of an interference fit, snap enclosure, or other means for fastening. The waste container 410 may further include means for attaching the leash, such as wraps, loops, hook-and-loop type fastener, etc. The leash 420 may be attached to the waste container 410 at a first location 411 on the top surface of the waste container 410 and at a second location 412 on the top surface of the waste container 410 to form a first handle 415. For example, the leash 420 may be attached to the waste container 410 at the first location 411 on the top surface of the waste container 410 at or near a right surface of the waste container 410 and at a second location 412 on the top surface of the waste container 410 at or near a left surface of the waste container 410. The leash 420 may be attached to the waste container 410 at the first location 411 at a base 427 of a second handle 425 of the leash 420.

The preceding description has been presented with reference to various embodiments of the present disclosure. Persons skilled in the art to which this disclosure pertains will appreciate that alterations and changes in the described structures and methods of operation can be practiced without meaningfully departing from the principles, spirit, and scope of this disclosure.

While this disclosure has been described in detail with particular references to exemplary embodiments thereof, the exemplary embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims. Although relative terms such as "first," "second," "third," "fourth," "front," "rear," "top," "bottom," "left," "right," "outer," "inner," "length," "width," "height" and similar terms have been used herein to describe a spatial relationship of one element to another, it is understood that these terms are intended to encompass different orientations of the various elements and components of the device in addition to the orientation depicted in the figures. Moreover, the figures contained in this application are not necessarily drawn to scale.

What is claimed is:

1. A waste disposal and storage device comprising:
  a container comprising:
    an upper side, a lower side opposite the upper side, and a pair of intermediate sides spaced apart from each other along a lengthwise direction and each extending from the upper side to the lower side, wherein the upper side, the lower side, and the pair of intermediate sides define a perimeter of the container; and
    a first compartment and a second compartment;
  a leash permanently affixed to the container at each of a first location of the container and a second location of the container that are at opposite end regions of the upper side along the lengthwise direction, a portion of the leash between the first location and the second location defining a first handle having a fixed length, wherein the leash is continuous from a first end to a second end, the first end defining a second handle configured as a loop, and the leash comprising a clip at the second end that is a free end to attach to a collar of an animal, wherein the leash is permanently affixed between the first end and the second end at the first and second locations;
  a handle cover attached to the first handle and configured to wrap around and secure the second handle and another portion of the leash that is between the first handle and the second end in a bundled state together with the first handle, the second handle having a length such that the second handle may be folded and wrapped by the handle cover in the bundled state; and
  a hoop located at a position on an outer surface of the container proximate the lower side and distal from the first and second locations, the leash configured to wrap around the perimeter of the container and pass through the handle cover, and the clip configured to align and engage with the hoop when the leash is snugly wrapped around the perimeter of the container and passing through the handle cover without slack and completing a revolution around the perimeter to maintain the bundled state.

2. The waste disposal and storage device of claim 1, wherein the container further comprises a first opening in a surface of the container exposing a portion of the second compartment.

3. The waste disposal and storage device of claim 2, further comprising a waste bag inside the second compartment, wherein the waste bag is accessible through the first opening in the surface of the container.

4. The waste disposal and storage device of claim 1, wherein the first compartment of the container comprises a liner.

5. The waste disposal and storage device of claim 4, wherein the liner comprises vinyl, plastic, polyester, cotton, or denim.

6. The waste disposal and storage device of claim 1, wherein the first compartment is defined by a second opening in a surface of the container and a liner.

7. The waste disposal and storage device of claim 6, wherein the second opening extends in the lengthwise direction.

8. The waste disposal and storage device of claim 7, wherein the second opening extends along an entire length of the surface of the container in the lengthwise direction.

9. The waste disposal and storage device of claim 8, wherein the second opening extends in a height direction of the container.

10. The waste disposal and storage device of claim 8, wherein the second opening is closable.

11. The waste disposal and storage device of claim 1, further comprising a door configured to provide access to the first compartment,
wherein the door is movable between a closed configuration and an open configuration, and
wherein at least a portion of the first compartment is exposed when the door is in the open configuration.

12. The waste disposal and storage device of claim 11, wherein the door and the container are connected by a hinge.

13. The waste disposal and storage device of claim 1, wherein the leash and the container are integrally formed.

14. The waste disposal and storage device of claim 1, wherein the container defines a groove along side surfaces and a bottom surface of the container, the groove being configured to receive the leash when the leash is wrapped around the container.

15. The waste disposal and storage device of claim 1, wherein the clip configured to align and engage with the hoop when the leash is snugly wrapped around the perimeter of the container and passing through the handle cover without slack and completing more than one revolution around the perimeter to maintain the bundled state.

16. The waste disposal and storage device of claim 1, wherein the handle cover comprises a hook-and-loop type fastener to secure the handle cover when wrapped around the second handle and the another portion of the leash.

17. The waste disposal and storage device of claim 1, wherein the hoop is located on an intermediate side of the pair of intermediate sides that is opposite the second handle.

* * * * *